United States Patent
Wang et al.

(10) Patent No.: US 10,757,693 B2
(45) Date of Patent: Aug. 25, 2020

(54) BASE STATION, USER EQUIPMENT AND WIRELESS COMMUNICATION METHOD

(71) Applicant: Panasonic Intellectual Property Corporation of America, Torrance, CA (US)

(72) Inventors: Lilei Wang, Beijing (CN); Ayako Horiuchi, Kanagawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 16 days.

(21) Appl. No.: 16/096,070

(22) PCT Filed: May 12, 2016

(86) PCT No.: PCT/CN2016/081924
§ 371 (c)(1),
(2) Date: Oct. 24, 2018

(87) PCT Pub. No.: WO2017/193349
PCT Pub. Date: Nov. 16, 2017

(65) Prior Publication Data
US 2019/0141681 A1    May 9, 2019

(51) Int. Cl.
*H04W 72/04* (2009.01)
*H04L 1/00* (2006.01)
(Continued)

(52) U.S. Cl.
CPC ......... *H04W 72/042* (2013.01); *H04L 1/0007* (2013.01); *H04L 1/0025* (2013.01);
(Continued)

(58) Field of Classification Search
CPC ... H04L 1/0007; H04L 1/0025; H04L 1/0039; H04L 5/0007; H04L 5/1469;
(Continued)

(56) References Cited

U.S. PATENT DOCUMENTS 10,517,083 B2 * 12/2019 You .................. H04L 5/0035
2011/0292847 A1 * 12/2011 Yoon ................. H04L 5/0007
370/280

(Continued)

FOREIGN PATENT DOCUMENTS

| CN | 104468030 A | 3/2015 |
|---|---|---|
| JP | 2017-530653 A | 10/2017 |
| WO | 2016/064059 A1 | 4/2016 |

OTHER PUBLICATIONS

The partial supplementary European search report (R.164 EPC) dated Apr. 16, 2019 for the related European Patent Application No. 16901304.2.

(Continued)

*Primary Examiner* — Saad A. Waqas
(74) *Attorney, Agent, or Firm* — Seed IP Law Group LLP

(57) ABSTRACT

Provided are base stations, user equipments and wireless communication methods related to DCI design for latency reduction. A base station comprises: circuitry operative to form either a first type of DCI or a second type of DCI depending on whether to schedule a normal TTI or a shortened TTI in a subframe; and a transmitter operative to transmit the first type of DCI or the second type of DCI in the subframe, wherein the first type of DCI and the second type of DCI are differentiable; and if the second type of DCI is transmitted and another shortened TTI is to be scheduled, the circuitry is further operative to form a third type of DCI and the transmitter is further operative to transmit the third (Continued)

type of DCI in a shortened TTI after said shortened TTI that is scheduled by the second type of DCI in the subframe.

3 Claims, 8 Drawing Sheets

(51) Int. Cl.
*H04W 76/27* (2018.01)
*H04L 5/14* (2006.01)
*H04L 5/00* (2006.01)

(52) U.S. Cl.
CPC .......... *H04L 1/0039* (2013.01); *H04L 5/1469* (2013.01); *H04W 72/0446* (2013.01); *H04W 72/0453* (2013.01); *H04W 76/27* (2018.02); *H04L 5/0007* (2013.01)

(58) Field of Classification Search
CPC ........... H04W 72/042; H04W 72/0446; H04W 72/0453; H04W 76/27
See application file for complete search history.

(56) References Cited

U.S. PATENT DOCUMENTS

| | | | |
|---|---|---|---|
| 2013/0223366 | A1 | 8/2013 | Papasakellariou et al. |
| 2013/0294366 | A1 | 11/2013 | Papasakellariou et al. |
| 2014/0198737 | A1 | 7/2014 | Papasakellariou |
| 2014/0328260 | A1 | 11/2014 | Papasakellariou et al. |
| 2015/0312014 | A1 | 10/2015 | Papasakellariou |
| 2016/0013894 | A1 | 1/2016 | Papasakellariou |
| 2016/0014751 | A1 | 1/2016 | Papasakellariou et al. |
| 2016/0014752 | A1 | 1/2016 | Papasakellariou et al. |
| 2016/0128028 | A1* | 5/2016 | Mallik ................ H04W 72/042 370/336 |
| 2017/0164363 | A1 | 6/2017 | Zhang et al. |
| 2019/0036758 | A1* | 1/2019 | Takeda ................ H04L 27/2666 |
| 2019/0044692 | A1* | 2/2019 | Li ......................... H04L 1/0007 |
| 2019/0229878 | A1* | 7/2019 | Takeda ................ H04L 1/0038 |

OTHER PUBLICATIONS

Huawei et al: "Short TTI for DL transmissions", 3GPP Draft; R1-160292, 3rd Generation Partnership Project (3GPP), Mobile Competence Centre ; 650, Route Des Lucioles ; F-06921 Sophia-Antipolis Cedex ; France, vol. RAN WG1, No. St Julian's, Malta; Feb. 15, 2016-Feb. 19, 2016, Feb. 14, 2016 (Feb. 14, 2016), XP051053632, Retrieved from the Internet: URL:http://www.3gpp.org/ftp/Meetings_3GPP_SYNC/RAN1/Docs/ [retrieved on Feb. 14, 2016].

Panasonic: "Multiplexing between non-sTTI and sTTI UEs", 3GPP Draft; R1-162535, 3rd Generation Partnership Project (3GPP), Mobile Competence Centre ; 650, Route Des Lucioles ; F-06921 Sophia-Antipolis Cedex ; France, vol. RAN WG1, No. Busan, Korea; Apr. 11, 2016-Apr. 15, 2016, Apr. 1, 2016 (Apr. 1, 2016), XP051079599, Retrieved from the Internet: URL:http://www.3gpp.org/ftp/tsg_ran/WG1_RL1/TSGR1_84b/Docs/ [retrieved on Apr. 1, 2016].

The Extended European Search Report dated Jul. 22, 2019 for the related European Patent Application No. 16901304.2.

Interdigital: "Short-TTI PDCCH Design", 3GPP Draft; R1-162963 SPDCCH, 3rd Generation Partnership Project (3GPP), Mobile Competence Centre; 650, Route Des Lucioles; F-06921 Sophia-Antipolis Cedex; France, vol. RAN WG1, No. Busan, Korea; Apr. 11, 2016-Apr. 15, 2016 Apr. 1, 2016 (Apr. 1, 2016), XP051079866, Retrieved from the Internet: URL:http://www.3gpp.org/ftp/tsg_ran/WG1_RL1/TSGR1_84b/Docs/ [retrieved on Apr. 1, 2016].

International Search Report of PCT application No. PCT/CN2016/081924 dated Jan. 26, 2017.

Huawei, HiSilicon, PDCCH design for short TTI [online].3GPP TSG RAN WGI Meeting #84bis R1-162109, Internet<URL:http://www.3gpp.org/ftp/tsg_ran/WGI_RL1/TSGR1_84b/Docs/R1-162109.zip>, Apr. 1, 2016.

* cited by examiner

200

```
┌─────────────────────────────────────────────┐
│ forming either a first type of DCI or a     │  201
│ second type of DCI depending on whether to  │
│ schedule a normal TTI or a shortened TTI    │
│ in a subframe                               │
└─────────────────────────────────────────────┘
                      │
                      ▼
┌─────────────────────────────────────────────┐
│ transmitting the first type of DCI or the   │  202
│ second type of DCI in the subframe          │
└─────────────────────────────────────────────┘
                      │
                      ▼
┌─────────────────────────────────────────────┐
│ if the second type of DCI is transmitted    │
│ and another shortened TTI is to be          │  203
│ scheduled, forming and transmitting a third │
│ type of DCI in a shortened TTI after said   │
│ shortened TTI that is scheduled by the      │
│ second type of DCI in the subframe          │
└─────────────────────────────────────────────┘
```

```
┌─────────────────────────────────────────────┐
│ detecting a first type of DCI for scheduling│  301
│ a normal TTI or a second type of DCI for    │
│ scheduling a shortened TTI in a subframe    │
└─────────────────────────────────────────────┘
                      │
                      ▼
┌─────────────────────────────────────────────┐
│ if the detected DCI is the second type of   │
│ DCI, further detecting a third type of DCI  │  302
│ in shortened TTI(s) starting from the       │
│ shortened TTI right after said shortened    │
│ TTI that is scheduled by the second type of │
│ DCI in the subframe                         │
└─────────────────────────────────────────────┘
```

```
┌─────────────────────────────────────────────────────┐
│ detecting one type of DCI for a subframe if the length of │
│ shortened TTIs in the subframe is not smaller than a │── 801
│ predetermined length and detecting two types of DCI for │
│   the subframe if the length of shortened TTIs in the │
│     subframe is smaller than the predetermined length │
└─────────────────────────────────────────────────────┘
                         │
                         ▼
┌─────────────────────────────────────────────────────┐
│   obtaining common information for one slot or one  │── 802
│  subframe from one of the two types of DCI and obtain │
│   information specific to a target shortened TTI from the │
│              other of the two types of DCI          │
└─────────────────────────────────────────────────────┘
```

```
┌─────────────────────────────────────────────────────┐
│  forming a fourth type of DCI for a subframe if one type of │
│    DCI is to be used for all shortened TTIs of the subframe │── 901
│   and forming a second type of DCI and a third type of DCI │
│      for the subframe if two types of DCI are to be used for │
│              shortened TTIs of the subframe         │
└─────────────────────────────────────────────────────┘
                         │
                         ▼
┌─────────────────────────────────────────────────────┐
│  transmitting the fourth type of DCI in at least the PDCCH │
│     region or the start shortened TTI of the subframe if the │
│  fourth type of DCI is used and transmitting the second type │── 902
│   of DCI in the PDCCH region or the start shortened TTI of │
│    the subframe and the third type of DCI in one or more │
│       shortened TTI(s) after the second type of DCI in the │
│     subframe if the second type of DCI and the third type of │
│                       DCI are used                   │
└─────────────────────────────────────────────────────┘
```

Fig.9

BASE STATION, USER EQUIPMENT AND WIRELESS COMMUNICATION METHOD

BACKGROUND

1. Technical Field

The present disclosure relates to the field of wireless communication, and in particular, to base stations (eNBs), user equipments (UE) and wireless communication methods related to downlink control information (DCI) design for latency reduction.

2. Description of the Related Art

Latency reduction is a new study item in 3GPP RAN1 and a main assumption is that the transmission time interval (TTI) length can be shortened from 14 orthogonal frequency division multiplexing (OFDM) symbols (1 ms) to 7 or less OFDM symbol(s) to reduce the latency. The TTI whose length is 7 or less OFDM symbol(s) is also referred to a shortened TTI (also abbreviated as sTTI) hereafter.

SUMMARY

One non-limiting and exemplary embodiment provides DCI design with respect to shortened TTIs for latency reduction.

In a first general aspect of the present disclosure, there is provided a base station comprising: circuitry operative to form either a first type of DCI or a second type of DCI depending on whether to schedule a normal TTI or a shortened TTI in a subframe; and a transmitter operative to transmit the first type of DCI or the second type of DCI in the subframe, wherein the normal TTI has 14 OFDM symbols, and the shortened TTI has 7 or less OFDM symbols; the first type of DCI schedules the normal TTI and the second type of DCI schedules the shortened TTI; the first type of DCI and the second type of DCI are differentiable from each other; and if the second type of DCI is transmitted and another shortened TTI is to be scheduled, the circuitry is further operative to form a third type of DCI and the transmitter is further operative to transmit the third type of DCI in a shortened TTI after said shortened TTI that is scheduled by the second type of DCI in the subframe.

In a second general aspect of the present disclosure, there is provided a user equipment comprising: a detector operative to detect a first type of DCI for scheduling a normal TTI or a second type of DCI for scheduling a shortened TTI in a subframe; circuitry operative to determine whether the detected DCI is the first type of DCI or the second type of DCI, wherein if the detected DCI is the second type of DCI, the detector is further operative to detect a third type of DCI in shortened TTI(s) starting from the shortened TTI right after said shortened TTI that is scheduled by the second type of DCI in the subframe; and the normal TTI has 14 OFDM symbols, and the shortened TTI has 7 or less OFDM symbols.

In a third general aspect of the present disclosure, there is provided a base station comprising: circuitry operative to form a fourth type of DCI for a subframe if one type of DCI is to be used for all shortened TTIs of the subframe and form a second type of DCI and a third type of DCI for the subframe if two types of DCI are to be used for shortened TTIs of the subframe; and a transmitter operative to transmit the fourth type of DCI in at least the PDCCH region or the start shortened TTI of the subframe if the fourth type of DCI is used and transmit the second type of DCI in the PDCCH region or the start shortened TTI of the subframe and the third type of DCI in one or more shortened TTI(s) after the second type of DCI in the subframe if the second type of DCI and the third type of DCI are used, wherein the shortened TTI has 7 or less OFDM symbols; and the fourth type of DCI and the second type of DCI are differentiable from each other.

In a fourth general aspect of the present disclosure, there is provided a user equipment comprising: a detector operative to detect a fourth type of DCI or a second type of DCI in the PDCCH region or the start shortened TTI of a subframe; and circuitry operative to determine whether the detected DCI is the fourth type of DCI or the second type of DCI, wherein if the detected DCI is the fourth type of DCI, the detector is further operative to detect the fourth type of DCI in one or more shortened TTIs after where the fourth type of DCI is detected for the first time in the subframe; if the detected DCI is the second type of DCI, the detector is further operative to detect a third type of DCI in one or more shortened TTIs after the second type of DCI in the subframe; and the shortened TTI has 7 or less OFDM symbols.

In a fifth general aspect of the present disclosure, there is provided a base station comprising: circuitry operative to form one type of DCI for a subframe if the length of shortened TTIs in the subframe is not smaller than a predetermined length and form two types of DCI for the subframe if the length of shortened TTIs in the subframe is smaller than the predetermined length; and a transmitter operative to transmit the formed one type of DCI or the formed two types of DCI, wherein the shortened TTI has 7 or less OFDM symbols; and one of the two types of DCI carries common information for one slot or one subframe, and the other of the two types of DCI carries information specific to its target shortened TTI.

In a sixth general aspect of the present disclosure, there is provided a user equipment comprising: a detector operative to detect one type of DCI for a subframe if the length of shortened TTIs in the subframe is not smaller than a predetermined length and detect two types of DCI for the subframe if the length of shortened TTIs in the subframe is smaller than the predetermined length; and circuitry operative to obtain common information for one slot or one subframe from one of the two types of DCI and obtain information specific to a target shortened TTI from the other of the two types of DCI, wherein the shortened TTI has 7 or less OFDM symbols.

In a seventh general aspect of the present disclosure, there is provided a base station for TDD communication comprising: circuitry operative to form DCI for indicating shortened TTI subframe(s) in a radio frame; and transmitter operative to transmit the DCI in CSS in subframe #0 of the radio frame or in a subframe in the previous radio frame, wherein the shortened TTI subframe is a subframe with DwPTS, guard band and UpPTS in which the ratio of DwPTS, guard band and UpPTS is arbitrarily configurable by RRC.

In an eighth general aspect of the present disclosure, there is provided a user equipment for TDD communication comprising: a detector operative to detect DCI in CSS in subframe #0 of a radio frame or in a subframe in the previous radio frame; and circuitry operative to determine shortened TTI subframe(s) in the radio frame based the detected DCI, wherein the shortened TTI subframe is a subframe with DwPTS, guard band and UpPTS in which the ratio of DwPTS, guard band and UpPTS is arbitrarily configurable by RRC.

In a ninth general aspect of the present disclosure, there is provided a wireless communication method comprising: forming either a first type of DCI or a second type of DCI depending on whether to schedule a normal TTI or a shortened TTI in a subframe; and transmitting the first type of DCI or the second type of DCI in the subframe, wherein the normal TTI has 14 OFDM symbols, and the shortened TTI has 7 or less OFDM symbols; the first type of DCI schedules the normal TTI and the second type of DCI schedules the shortened TTI; the first type of DCI and the second type of DCI are differentiable from each other; and if the second type of DCI is transmitted and another shortened TTI is to be scheduled, the method further comprises forming and transmitting a third type of DCI in a shortened TTI after said shortened TTI that is scheduled by the second type of DCI in the subframe.

In a tenth general aspect of the present disclosure, there is provided a wireless communication method comprising: detecting a first type of DCI for scheduling a normal TTI or a second type of DCI for scheduling a shortened TTI in a subframe; if the detected DCI is the second type of DCI, further detecting a third type of DCI in shortened TTI(s) starting from the shortened TTI right after said shortened TTI that is scheduled by the second type of DCI in the subframe, wherein the normal TTI has 14 OFDM symbols, and the shortened TTI has 7 or less OFDM symbols.

In an eleventh general aspect of the present disclosure, there is provided a wireless communication method comprising: forming a fourth type of DCI for a subframe if one type of DCI is to be used for all shortened TTIs of the subframe and forming a second type of DCI and a third type of DCI for the subframe if two types of DCI are to be used for shortened TTIs of the subframe, and transmitting the fourth type of DCI in at least the PDCCH region or the start shortened TTI of the subframe if the fourth type of DCI is used and transmit the second type of DCI in the PDCCH region or the start shortened TTI of the subframe and the third type of DCI in one or more shortened TTI(s) after the second type of DCI in the subframe if the second type of DCI and the third type of DCI are used, wherein the shortened TTI has 7 or less OFDM symbols; and the fourth type of DCI and the second type of DCI are differentiable from each other.

In a twelfth general aspect of the present disclosure, there is provided a wireless communication method comprising: detecting a fourth type of DCI or a second type of DCI in the PDCCH region or the start shortened TTI of a subframe; if the detected DCI is the fourth type of DCI, further detecting the fourth type of DCI in one or more shortened TTIs after where the fourth type of DCI is detected for the first time in the subframe; and if the detected DCI is the second type of DCI, further detecting a third type of DCI in one or more shortened TTIs after the second type of DCI in the subframe, wherein the shortened TTI has 7 or less OFDM symbols.

In a thirteenth general aspect of the present disclosure, there is provided a wireless communication method comprising: forming one type of DCI for a subframe if the length of shortened TTIs in the subframe is not smaller than a predetermined length and forming two types of DCI for the subframe if the length of shortened TTIs in the subframe is smaller than the predetermined length; and transmitting the formed one type of DCI or the formed two types of DCI, wherein the shortened TTI has 7 or less OFDM symbols; and one of the two types of DCI carries common information for one slot or one subframe, and the other of the two types of DCI carries information specific to its target shortened TTI.

In a fourteenth general aspect of the present disclosure, there is provided a wireless communication method comprising: detecting one type of DCI for a subframe if the length of shortened TTIs in the subframe is not smaller than a predetermined length and detecting two types of DCI for the subframe if the length of shortened TTIs in the subframe is smaller than the predetermined length; and obtaining common information for one slot or one subframe from one of the two types of DCI and obtain information specific to a target shortened TTI from the other of the two types of DCI, wherein the shortened TTI has 7 or less OFDM symbols.

In a fifteenth general aspect of the present disclosure, there is provided a wireless communication method for TDD comprising: forming DCI for indicating shortened TTI subframe(s) in a radio frame; and transmitting the DCI in CSS in subframe #0 of the radio frame or in a subframe in the previous radio frame, wherein the shortened TTI subframe is a subframe with DwPTS, guard band and UpPTS in which the ratio of DwPTS, guard band and UpPTS is arbitrarily configurable by RRC.

In a sixteenth general aspect of the present disclosure, there is provided a wireless communication method for TDD comprising: detecting DCI in CSS in subframe #0 of a radio frame or in a subframe in the previous radio frame; and determining shortened TTI subframe(s) in the radio frame based on the detected DCI, wherein the shortened TTI subframe is a subframe with DwPTS, guard band and UpPTS in which the ratio of DwPTS, guard band and UpPTS is arbitrarily configurable by RRC.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 2 illustrates a flowchart of a wireless communication method performed by a base station according to an embodiment of the present disclosure;

FIG. 3 illustrates a flowchart of a wireless communication method performed by a UE according to an embodiment of the present disclosure;

FIG. 8 illustrates a flowchart of a wireless communication method performed by a UE according to an embodiment of the present disclosure;

FIG. 9 illustrates a flowchart of a wireless communication method performed by a base station according to an embodiment of the present disclosure;

DETAILED DESCRIPTION

Figure 1:
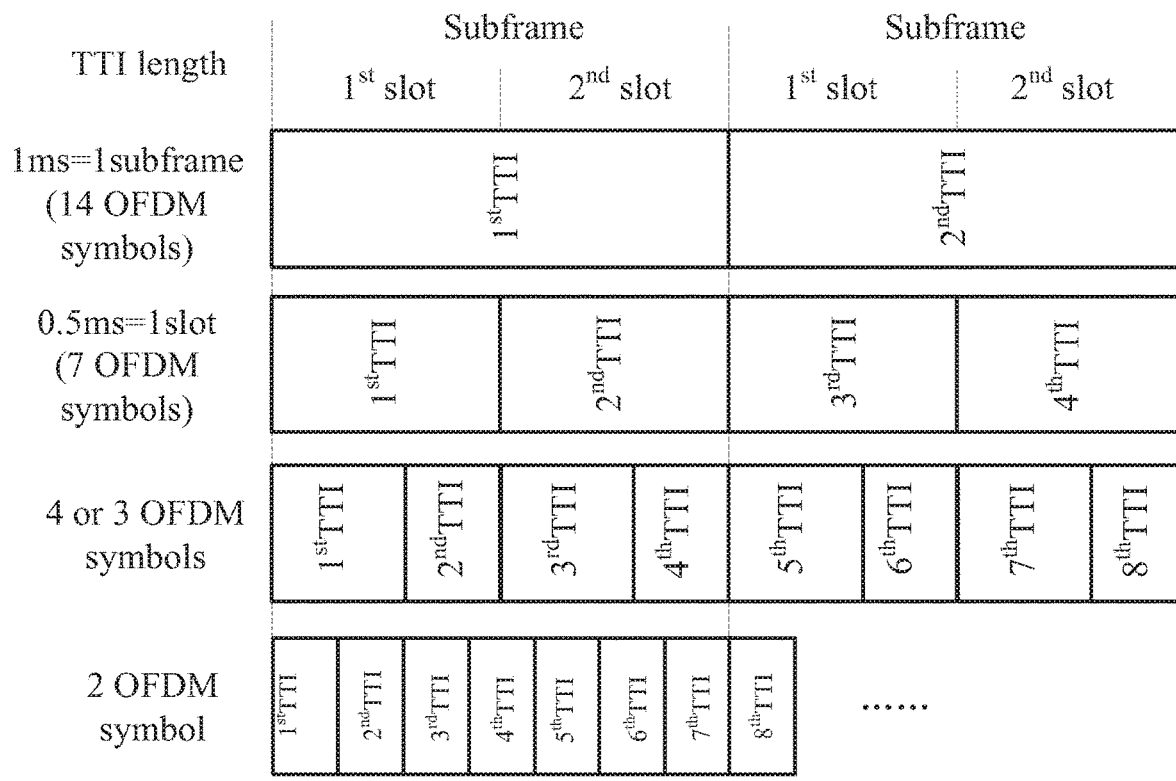
FIG. 1 schematically illustrates some examples of TTI length reduction.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

Latency reduction is a topic in 3GPP RAN1 and a main method is to reduce TTI length for example from 14 OFDM symbols (1 ms) to 2-7 OFDM symbols so that transmission latency can be reduced. FIG. 1 shows some examples of TTI length reduction. In FIG. 1, from the top to the bottom, the first plot shows normal TTIs, that is, the TTI length is one subframe; the second plot shows shortened TTIs whose length is 1 slot (7OFMD symbols); the third plot shows shortened TTIs whose length is 4 or 3 OFDM symbols (for example, the first and the third TTIs in a subframe have 4 OFDM symbols, and the second and the fourth TTIs have 3 OFDM symbols); the fourth plot shows shortened TTIs whose length is 2 OFDM symbols.

Signaling overhead of DCI will impact the performance (e.g., latency and user throughput) largely, so how to reduce DCI overhead is an important issue. Two-level DCI concept for a subframe with shortened TTIs was discussed in 3GPP RAN1#84bis meeting; however, details are yet to be determined. Basically, the concept means that two types of DCI (referred to as slow DCI and fast DCI) can be transmitted in the same subframe with shortened TTIs. The slow DCI can carry some common information for one slot or one subframe (UE-specific or cell-specific), and can only be transmitted once or twice in one subframe. It can have relatively larger size. The fast DCI can only carry limited information specific to the scheduled shortened TTIs and thus have relatively smaller size. The fast DCI can be transmitted in every shortened TTI if needed. Generally, the fast DCI is assumed to be UE-specific and is transmitted in shortened TTIs.

Under the concept of two-level DCI for a subframe with shortened TTIs, an embodiment of the present disclosure proposes a DCI design. FIG. 2 illustrates a flowchart of a wireless communication method 200 performed by a base station according to an embodiment of the present disclosure. At step 201, the base station forms either a first type of DCI or a second type of DCI depending on whether to schedule a normal TTI or a shortened TTI in a subframe. Here, the normal TTI has 14 OFDM symbols, i.e. one subframe, and the shortened TTI has 7 or less OFDM symbols. The first type of DCI is used to schedule a normal TTI (i.e., a subframe), so it can be any suitable DCI format in existing LTE. The second type of DCI is used to schedule a shortened TTI in the subframe, and it can be a slow DCI described in the above. In an embodiment of the present disclosure, the first type of DCI is UE-specific and used to schedule the $1^{st}$ allocation shortened TTIs of the subframe. The first type of DCI and the second type of DCI are differentiable from each other, for example, they can have the same size but differ by a one bit field; therefore, when a UE detects a DCI, it can determine whether it is the first type of DCI or the second type of DCI, and thus determine the subframe is a normal subframe or a subframe with shortened TTIs. At step 202, the base station transmits the first type of DCI or the second type of DCI in the subframe. The first type of DCI can be transmitted in the PDCCH (Physical Downlink Control Channel) region or ePDCCH region, and the second type of DCI can be transmitted in the PDCCH region or a shortened TTI after the PDCCH region. In an example, both the first type of DCI and the second type of DCI are transmitted in the PDCCH region. Under this circumstance, if the first type of DCI and the second type of DCI have the same size, the blind decoding (BD) times can be reduced at UE side. At step 203, if the second type of DCI is transmitted and another shortened TTI is to be scheduled, the base station forms and transmits a third type of DCI in a shortened TTI following said shortened TTI that is scheduled by the second type of DCI in the subframe. When the second type of DCI is transmitted, it means the subframe is a subframe with shortened TTIs. Therefore, another shortened TTI other than the one scheduled by the second type of DCI in the subframe may need to be scheduled. Under this circumstance, the third type of DCI is transmitted to schedule another shortened TTI. The third type of DCI can be the fast DCI described in the above, which carries information specific to its target shortened TTI. According to an embodiment, the third type of DCI is transmitted in a shortened TTI after the one scheduled by the second type of DCI in the subframe, for example, in the shortened TTI to be scheduled by the third type of DCI. Therefore, the receiving UE only needs to detect the third type of DCI beginning from the shortened TTI right after the one scheduled by the second type of DCI in the subframe, which simplifies UE detection complexity and reduces BD times. In an embodiment of the present disclosure, the base station would not transmit any other DCI for a normal subframe than the first type of DCI.

At the UE side, FIG. 3 illustrates a flowchart of a wireless communication method 300 performed by a UE according to an embodiment of the present disclosure. At step 301, the UE detects a first type of DCI for scheduling a normal TTI or a second type of DCI for scheduling a shortened TTI in a subframe. At this step, the UE detects DCI, for example, in the PDCCH region. If the detection is successful, the UE determines whether the detected DCI is the first type of DCI or the second type of DCI. If the detection is not successful, the UE may continue to perform detection in other areas, for example, in ePDCCH region or in other shortened TTI(s); alternatively, the UE may not continue to perform detection but acknowledge detection failure. At step 302, if the detected DCI is the second type of DCI, the UE further detects a third type of DCI in shortened TTI(s) starting from the shortened TTI right after said shortened TTI that is scheduled by the second type of DCI in the subframe. As described in the above, if the second type of DCI is detected, it means that the subframe is a subframe with shortened TTIs, so a third type of DCI may be transmitted by the base station. Therefore, the UE needs to further detect the third type of DCI, starting from the shortened TTI right after said shortened TTI that is scheduled by the second type of DCI in the subframe. On the other hand, if the first type of DCI is detected, it means that a normal TTI is scheduled in the current subframe, and thus the UE will not detect the third type of DCI.

Figure 4:
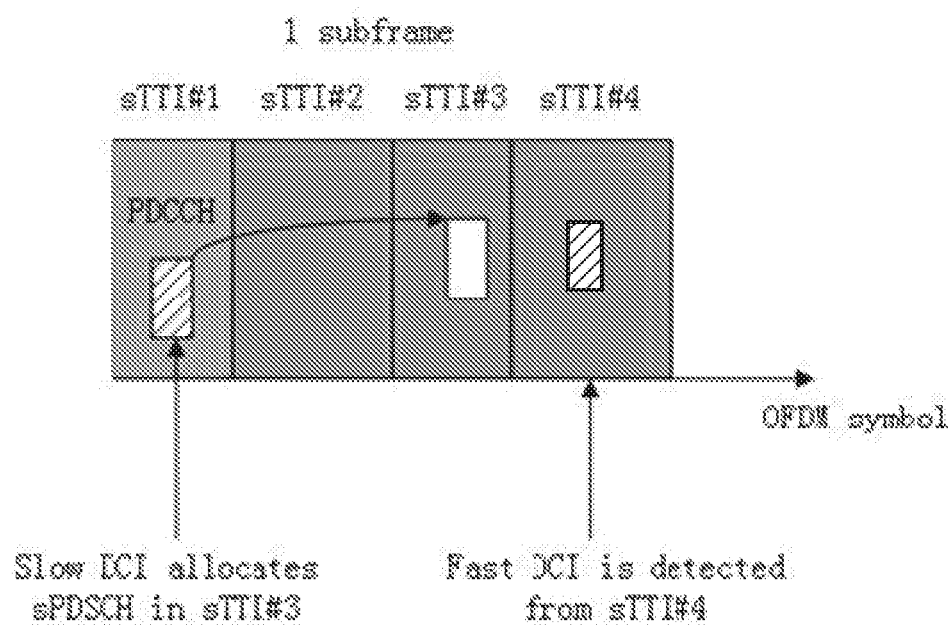
FIG. 4 schematically illustrates a two level DCI design according to an embodiment of the present disclosure.

FIG. 4 schematically illustrates a two level DCI design according to an embodiment of the present disclosure. In the illustrated subframe, there are four shortened TTIs (sTTIs), which are sTTI#1, sTTI#2, sTTI#3 and sTTI#4. The PDCCH is transmitted in sTTI#1. The slow DCI which is transmitted in the PDCCH region allocates sPDSCH (PDSCH transmitted in a shorted TTI) in sTTI#3, i.e., schedules sTTI#3. After detects the slow DCI in sTTI#1, UE will detect fast DCI, starting from sTTI#4 in this subframe rather than starting from sTTI#2. Therefore, it can simplify UE detection complexity and reduce blind decoding times.

Figure 5:
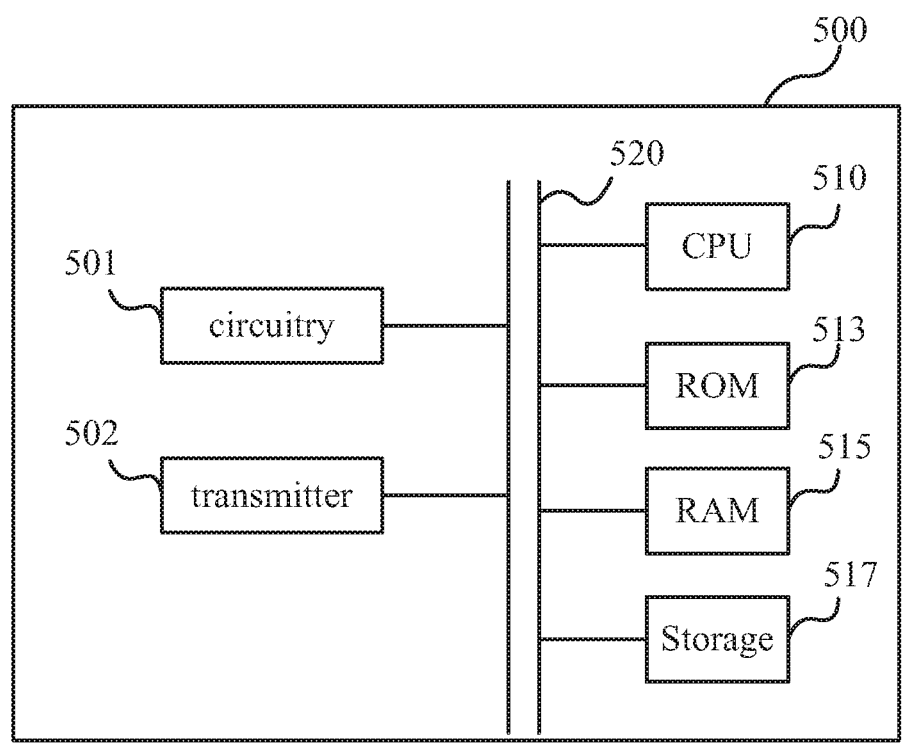
FIG. 5 schematically illustrates a block diagram of a base station according to an embodiment of the present disclosure.

Corresponding to the above wireless communication methods, embodiments of the present disclosure also provide a base station and a user equipment. FIG. 5 schematically illustrates a block diagram of a base station 500 according to an embodiment of the present disclosure. The base station 500 can comprise: circuitry 501 operative to form either a first type of DCI or a second type of DCI depending on whether to schedule a normal TTI or a shortened TTI in a subframe; and a transmitter 502 operative to transmit the first type of DCI or the second type of DCI in the subframe, wherein the normal TTI has 14 OFDM symbols, and the shortened TTI has 7 or less OFDM symbols; the first type of DCI schedules the normal TTI and the second type of DCI schedules the shortened TTI; the first type of DCI and the second type of DCI are differentiable from each other; and if the second type of DCI is transmitted and another shortened TTI is to be scheduled, the circuitry 501 is further operative to form a third type of DCI and the transmitter is further operative to transmit the third type of DCI in a shortened TTI after said shortened TTI that is scheduled by the second type of DCI in the subframe.

In addition, as shown in FIG. 5, the base station according to the present disclosure may optionally include a CPU (Central Processing Unit) 510 for executing related programs to process various data and control operations of respective units in the base station 500, a ROM (Read Only Memory) 513 for storing various programs required for performing various process and control by the CPU 510, a RAM (Random Access Memory) 515 for storing intermediate data temporarily produced in the procedure of process and control by the CPU 510, and/or a storage unit 517 for storing various programs, data and so on. The above circuitry 501, and transmitter 502, CPU 210, ROM 513, RAM 515 and/or storage unit 517 etc. may be interconnected via data and/or command bus 520 and transfer signals between one another.

Respective components as described above do not limit the scope of the present disclosure. According to one implementation of the disclosure, the functions of the above circuitry 501 and transmitter 502 may be implemented by hardware, and the above CPU 510, ROM 513, RAM 515 and/or storage unit 517 may not be necessary. Alternatively, part or all functions of the above circuitry 501 and/or transmitter 502 may also be implemented by functional software in combination with the above CPU 510, ROM 513, RAM 515 and/or storage unit 517 etc.

Figure 6:
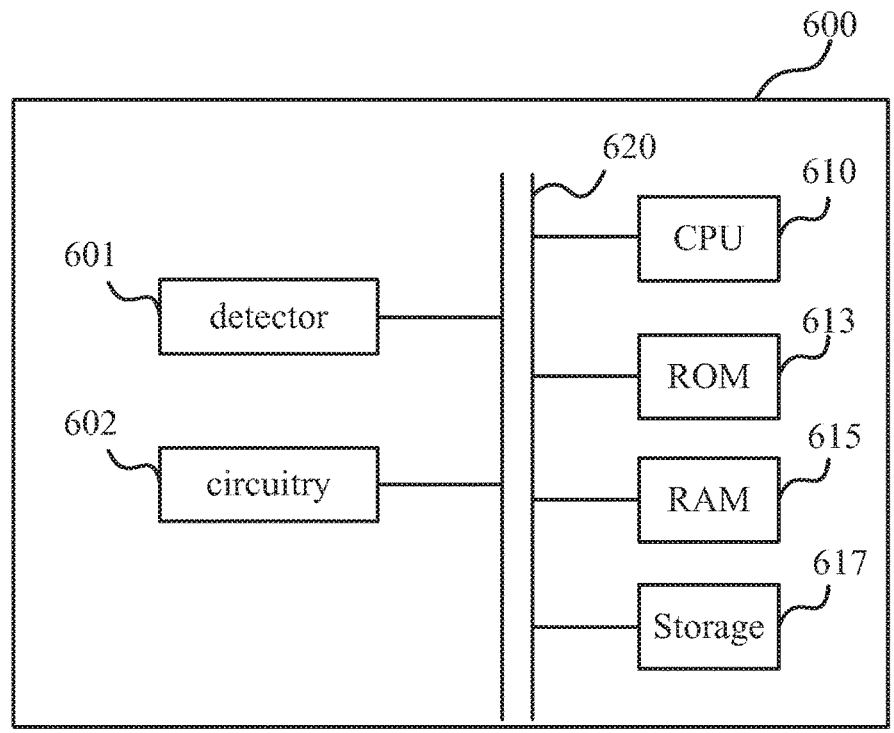
FIG. 6 schematically illustrates a block diagram of a user equipment according to an embodiment of the present disclosure.

FIG. 6 schematically illustrates a block diagram of a user equipment 600 according to an embodiment of the present disclosure. The user equipment 600 can comprise: a detector 601 operative to detect a first type of DCI for scheduling a normal TTI or a second type of DCI for scheduling a shortened TTI in a subframe; circuitry 602 operative to determine whether the detected DCI is the first type of DCI or the second type of DCI, wherein if the detected DCI is the second type of DCI, the detector 601 is further operative to detect a third type of DCI in shortened TTI(s) starting from the shortened TTI right after said shortened TTI that is scheduled by the second type of DCI in the subframe; and the normal TTI has 14 OFDM symbols, and the shortened TTI has 7 or less OFDM symbols.

In addition, as shown in FIG. 6, the user equipment according to the present disclosure may optionally include a CPU (Central Processing Unit) 610 for executing related programs to process various data and control operations of respective units in the user equipment 600, a ROM (Read Only Memory) 613 for storing various programs required for performing various process and control by the CPU 610, a RAM (Random Access Memory) 615 for storing intermediate data temporarily produced in the procedure of process and control by the CPU 610, and/or a storage unit 617 for storing various programs, data and so on. The above detector 601, and circuitry 602, CPU 610, ROM 613, RAM 615 and/or storage unit 617 etc. may be interconnected via data and/or command bus 620 and transfer signals between one another.

Respective components as described above do not limit the scope of the present disclosure. According to one implementation of the disclosure, the functions of the above detector 601 and circuitry 602 may be implemented by hardware, and the above CPU 610, ROM 613, RAM 615 and/or storage unit 617 may not be necessary. Alternatively, part or all functions of the above detector 601 and/or circuitry 602 may also be implemented by functional software in combination with the above CPU 610, ROM 613, RAM 615 and/or storage unit 617 etc.

Embodiments of the present disclosure also provide ways to support both two level DCI and one level DCI for a subframe with shortened TTIs. One level DCI means only one type of DCI is used for a subframe with shortened TTIs.

Figure 7:
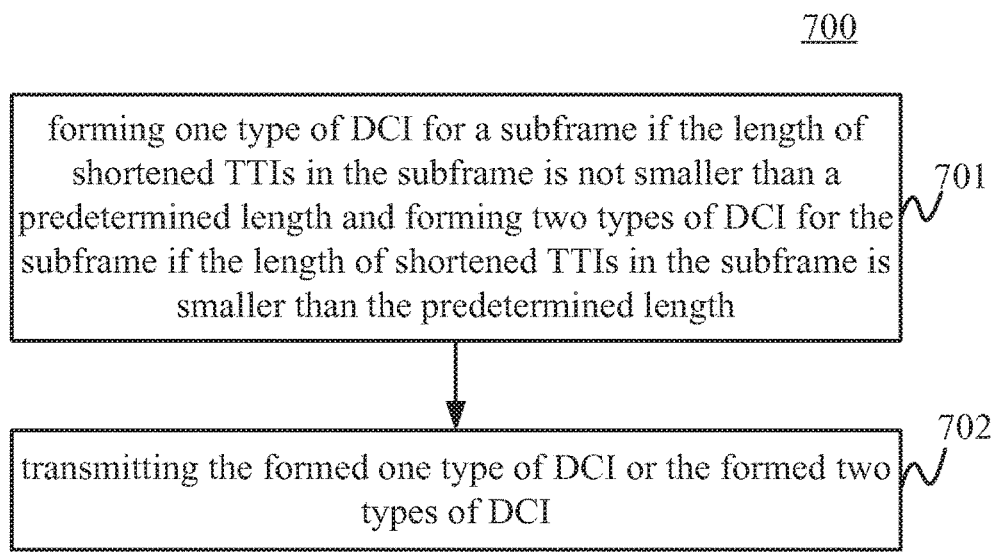
FIG. 7 illustrates a flowchart of a wireless communication method performed by a base station according to an embodiment of the present disclosure.

In an embodiment, a fixed approach for one-level DCI and two-level DCI can be employed. For example, a longer shortened TTI (e.g., 7 OFDM symbols) uses one-level DCI while a shorter shortened TTI (e.g., ¾ or 2 OFDM symbols) uses two-level DCI. Accordingly, FIG. 7 illustrates a flowchart of a wireless communication method 700 performed by a base station according to an embodiment of the present disclosure. At step 701, the base station forms one type of DCI for a subframe if the length of shortened TTIs in the subframe is not smaller than a predetermined length and forms two types of DCI for the subframe if the length of shortened TTIs in the subframe is smaller than the predetermined length. Here, the one type of DCI can be any DCI used to schedule shortened TTIs in a subframe, and the same type of DCI is used to schedule different shortened TTIs in the subframe. For example, in each shortened TTI that needs to be scheduled, one DCI of the same one type will be transmitted. The two types of DCI can be a slow DCI and a fast DCI, and the slow DCI carries common information for one slot or one subframe, and the fast DCI carries information specific to its target (scheduled) shortened TTI. The predetermined length can be specified or configured by the RRC (Radio Resource Control) or MAC (Medium Access Control) layer. For example, it can be 7 OFDM symbols. At step 702, the base station transmits the formed one type of DCI or the formed two types of DCI. When transmitting the one type of DCI, the base station can transmit one DCI of the one type in each shortened TTI that is to be scheduled. When transmitting the two types of DCI, the slow DCI can be only transmitted each slot or each subframe, and the fast DCI can be transmitted each time a shortened TTI needs to be scheduled.

FIG. 8 illustrates a flowchart of a wireless communication method 800 performed by a UE according to an embodiment of the present disclosure. At step 801, the UE detects one type of DCI for a subframe if the length of shortened TTIs in the subframe is not smaller than a predetermined length and detects two types of DCI for the subframe if the length of shortened TTIs in the subframe is smaller than the predetermined length. For example, if the length of shortened TTIs in the subframe is not smaller than the predetermined length, the UE can detect the same type of DCI in each shortened TTIs in the subframe; if the length of shortened TTIs in the subframe is smaller than the predetermined length, the UE can first detect the slow DCI and then detect the fast DCI in the subframe when the slow DCI is detected. At step 802, the UE obtains common information for one slot or one subframe from one (slow DCI) of the two types of DCI and obtain information specific to a target shortened TTI from the other (fast DCI) of the two types of DCI.

Accordingly, embodiments of the present invention provide a base station and a user equipment corresponding to the above wireless communication methods. The base station comprises: circuitry operative to form one type of DCI for a subframe if the length of shortened TTIs in the subframe is not smaller than a predetermined length and form two types of DCI for the subframe if the length of shortened TTIs in the subframe is smaller than the predetermined length; and a transmitter operative to transmit the formed one type of DCI or the formed two types of DCI, wherein the shortened TTI has 7 or less OFDM symbols, and one of the two types of DCI carries common information for one slot or one subframe, and the other of the two types of DCI carries information specific to its target shortened TTI. The user equipment comprises: a detector operative to detect one type of DCI for a subframe if the length of shortened TTIs in the subframe is not smaller than a predetermined length and detect two types of DCI for the subframe if the length of shortened TTIs in the subframe is smaller than the predetermined length; and circuitry operative to obtain common information for one slot or one subframe from one of the two types of DCI and obtain information specific to a target shortened TTI from the other of the two types of DCI, wherein the shortened TTI has 7 or less OFDM symbols. The specific structures of the above base station and user equipment can refer to FIG. 5 and FIG. 6.

In another embodiment, a dynamic approach for one-level DCI and two-level DCI can be employed. If the UE detects a one-level DCI (for example, in the PDCCH region or the start shortened TTI), the one-level DCI is also used in following shortened TTIs. If the UE detects a slow DCI (for example, in the PDCCH region or the start shortened TTI), two-level DCI is used in the subframe and fast DCI will be used in following shortened TTIs. It is noted that the start shortened TTI means the first shortened TTI in the subframe. There are two cases. In one case, the shortened TTIs are arranged from the beginning of the subframe, and thus the start shortened TTI is overlapped with the PDCCH region. In another case, the shortened TTIs are arranged after the PDCCH region, and then the start shortened TTI is the first shortened TTI after the PDCCH region. According to the above principle, FIG. 9 illustrates a flowchart of a wireless communication method 900 performed by a base station according to an embodiment of the present disclosure. At step 901, the base station forms a fourth type of DCI for a subframe if one type of DCI is to be used for all shortened TTIs of the subframe and forms a second type of DCI and a third type of DCI for the subframe if two types of DCI are to be used for shortened TTIs of the subframe. Here, the fourth type of DCI refers to the above mentioned one-level DCI for shortened TTIs, and the second type of DCI and the third type of DCI can be the slow DCI and the fast DCI described in the above respectively. At step 902, the base station can transmit the fourth type of DCI in at least the PDCCH region or the start shortened TTI of the subframe if the fourth type of DCI is used. At step 902, the base station can also transmit the second type of DCI in the PDCCH region or the start shortened TTI of the subframe and the third type of DCI in one or more shortened TTI(s) after the second type of DCI in the subframe if the second type of DCI and the third type of DCI are used. Here, the fourth type of DCI and the second type of DCI are differentiable from each other at UE side. The base station transmits the fourth type of DCI or the second type of DCI in the PDCCH region or the start shortened TTI of the subframe for the UE to detect and determine whether one-level DCI or two-level DCI is used for the subframe. When the one-level DCI is used, the base station will also transmit the one-level DCI in the following shortened TTIs if they are scheduled. When the two-level DCI is used, the base station will transmit the third type of DCI (e.g., fast DCI) different from the second type of DCI (e.g., slow DCI) in the following shortened TTIs if they are scheduled.

Figure 10:
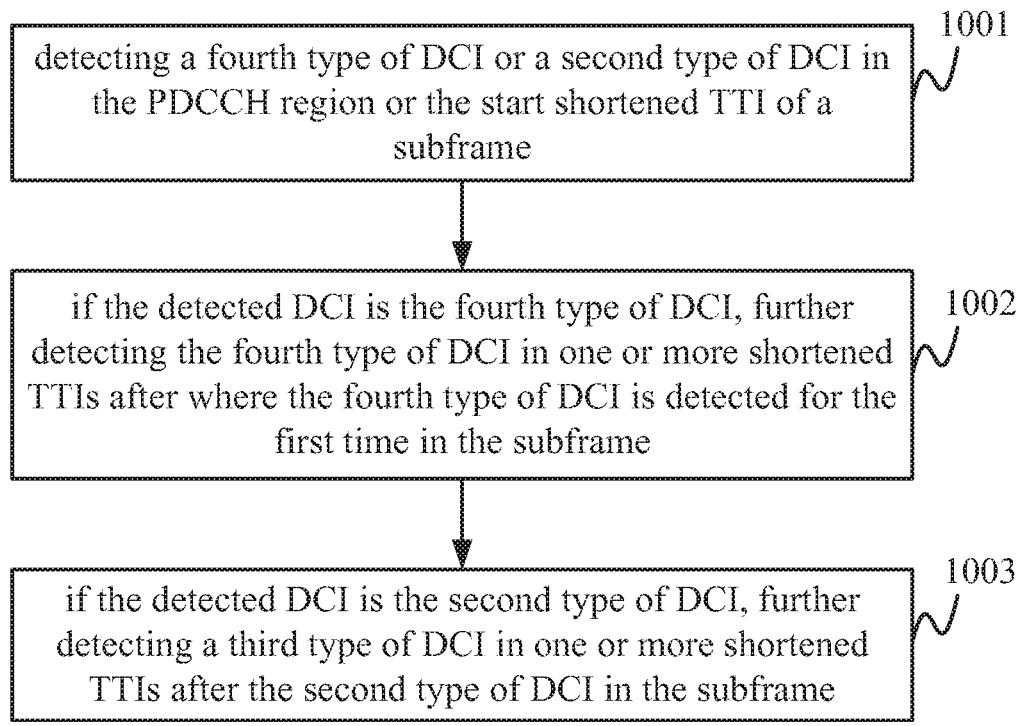
FIG. 10 illustrates a flowchart of a wireless communication method performed by a UE according to an embodiment of the present disclosure.

At the UE side, FIG. 10 illustrates a flowchart of a wireless communication method 1000 performed by a UE according to an embodiment of the present disclosure. At step 1001, the UE detects a fourth type of DCI or a second type of DCI in the PDCCH region or the start shortened TTI of a subframe. At step 1002, if the detected DCI is the fourth type of DCI, the UE further detects the fourth type of DCI in one or more shortened TTIs after where the fourth type of DCI is detected for the first time in the subframe. At step 1003, if the detected DCI is the second type of DCI, the UE further detects a third type of DCI in one or more shortened TTIs after the second type of DCI in the subframe. In this embodiment, the UE can determine whether one-level DCI or two-level DCI is used based on the DCI type detected in the PDCCH region or the start shortened TTI of the subframe.

Figure 11:
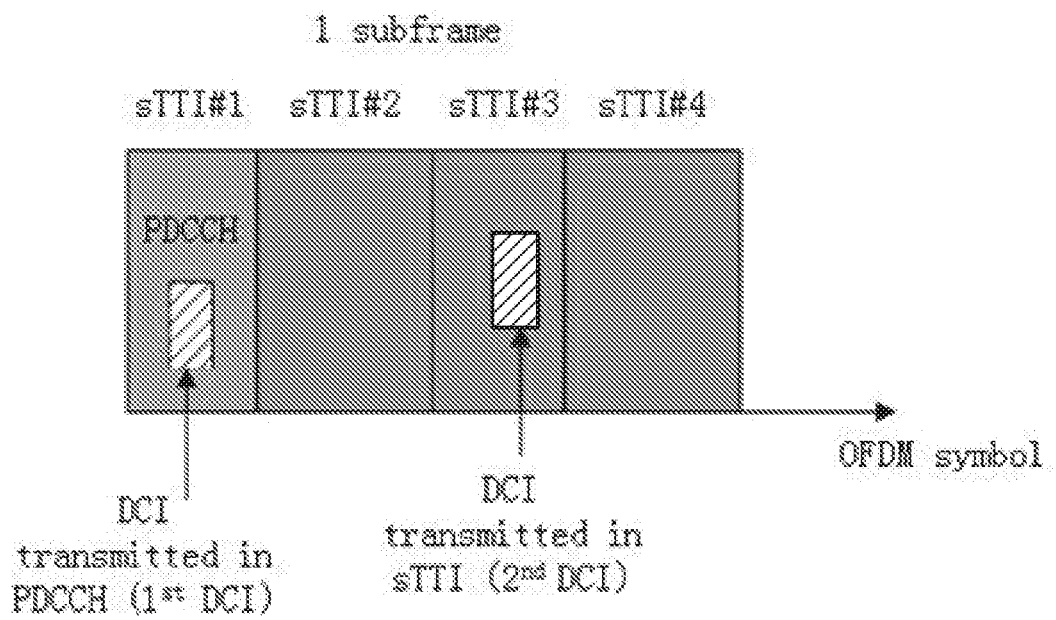
FIG. 11 schematically illustrates a DCI design with respect to one-level DCI or two-level DCI for a subframe with shortened TTIs.

FIG. 11 schematically illustrates a DCI design with respect to one-level DCI or two-level DCI for a subframe with shortened TTIs. In the illustrated subframe, there are four shortened TTIs (sTTIs), which are sTTI#1, sTTI#2, sTTI#3 and sTTI#4. The PDCCH is transmitted in sTTI#1. If the DCI (the 1st DCI) transmitted in the PDCCH region is the fourth type of DCI (i.e., the one-level DCI), the following DCI (the 2nd DCI) transmitted in a shortened TTI is also the fourth type of DCI. If the DCI (the 1st DCI) transmitted in the PDCCH region is the second type of DCI (e.g., the slow DCI), it means two-level DCI is used, and the following DCI (the 2nd DCI) transmitted in a shortened TTI is the third type of DCI (e.g., the fast DCI).

Further, in an embodiment, the UE may also determine whether the subframe is a normal subframe or a subframe with shortened TTIs based on the DCI type detected in the PDCCH region of the subframe. In this case, the base station can further form and transmit a first type of DCI for the subframe if a normal TTI with 14 OFDM symbols is to be scheduled, and the first type of DCI transmit in the PDCCH region of the subframe. The first type of DCI is any DCI for scheduling a normal subframe, as described in the above. Now, the UE can detect three types of DCI in the PDCCH region or the start shortened TTI, i.e., the first type of DCI, the second type of DCI and the fourth type of DCI which are differentiable from one another. In an embodiment, they can have the same size and be differentiable by a two bit field. After the UE detects a DCI in the PDCCH region, it can determine whether the subframe is a normal subframe or a subframe with shortened TTIs, and can also determine whether a two-level DCI or a one-level DCI is used when the subframe is a subframe with shortened TTIs. When the first type of DCI is detected, i.e., a normal subframe is applied, the UE will not detect any other DCI in the subframe.

Accordingly, embodiments of the present invention provide a base station and a user equipment corresponding to the above wireless communication methods. The base station can comprise: circuitry operative to form a fourth type of DCI for a subframe if one type of DCI is to be used for all shortened TTIs of the subframe and form a second type of DCI and a third type of DCI for the subframe if two types of DCI are to be used for shortened TTIs of the subframe; and a transmitter operative to transmit the fourth type of DCI in at least the PDCCH region or the start shortened TTI of the subframe if the fourth type of DCI is used and transmit the second type of DCI in the PDCCH region or the start shortened TTI of the subframe and the third type of DCI in one or more shortened TTI(s) after the second type of DCI in the subframe if the second type of DCI and the third type of DCI are used. In an embodiment, the circuitry is further operative to form a first type of DCI for the subframe if a normal TTI with 14 OFDM symbols is to be scheduled, the transmitter is further operative to transmit the first type of DCI in the PDCCH region of the subframe, and the first type of DCI, the second type of DCI and the fourth type of DCI are differentiable from one another. In an embodiment, the first type of DCI, the second type of DCI and the fourth type of DCI have the same size and are differentiable by a two bit field. The user equipment can comprise: a detector operative to detect a fourth type of DCI or a second type of DCI in the PDCCH region or the start shortened TTI of a subframe; circuitry operative to determine whether the detected DCI is the fourth type of DCI or the second type of DCI, wherein if the detected DCI is the fourth type of DCI, the detector is further operative to detect the fourth type of DCI in one or more shortened TTIs after where the fourth type of DCI is first detected in the subframe, and if the detected DCI is the second type of DCI, the detector is further operative to detect a third type of DCI in one or more shortened TTIs after the second type of DCI in the subframe. In an embodiment, the detector is further operative to detect a first type of DCI for scheduling a normal TTI with 14 OFDM symbols in the PDCCH region of the subframe; and if the first type of DCI is detected, the detector is operative to not detect DCI any more in the subframe. The specific structures of the above base station and user equipment can refer to FIG. 5 and FIG. 6.

Figure 12:
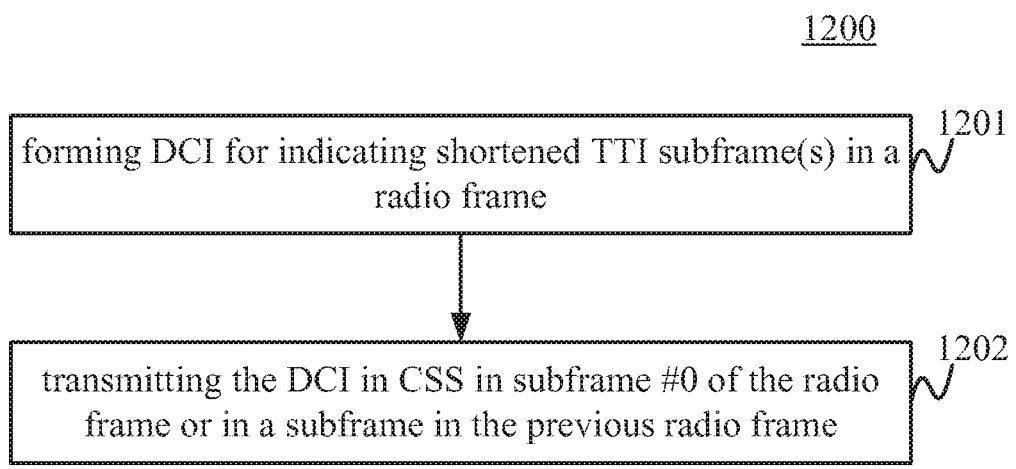
FIG. 12 illustrates a flowchart of a wireless communication method for TDD performed by a base station according to an embodiment of the present disclosure.
Figure 13:
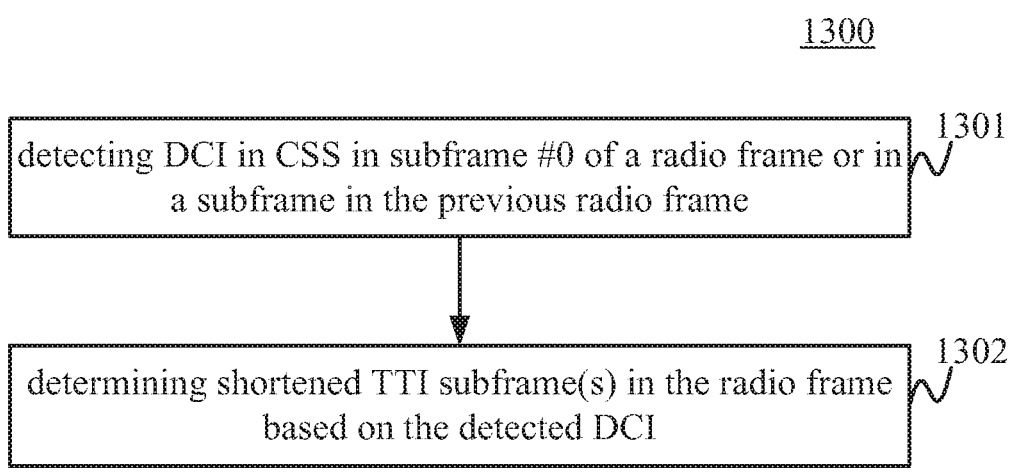
FIG. 13 illustrates a flowchart of a wireless communication method for TDD performed by a UE according to an embodiment of the present disclosure.

The above describes the DCI design for a subframe with shortened TTIs in FDD (Frequency Division Duplex) communication. For TDD (Time Division Duplex) communication, in order to reduce latency, an embodiment of the present disclosure introduces a new type of subframe, which is referred to as a shortened TTI subframe in the present disclosure. The shortened TTI subframe in TDD is a subframe containing DwPTS, guard band and UpPTS in which the ratio of DwPTS, guard band and UpPTS is arbitrarily configurable by RRC. According to an embodiment of the present disclosure, one or more subframes in a radio frame can use the shortened TTI subframe; therefore, downlink transmission and uplink transmission can be flexibly adapted to reduce latency. In order for the UE to know which subframe in the radio frame is a shortened TTI subframe, DCI can be transmitted to make an indication. Accordingly, FIG. 12 illustrates a flowchart of a wireless communication method 1200 for TDD performed by a base station according to an embodiment of the present disclosure. At step 1201, the base station forms DCI for indicating shortened TTI subframe(s) in a radio frame. At step 1202, the base station transmits the DCI in CSS (Common Search Space) in subframe #0 of the radio frame or in a subframe in the previous radio frame. At the UE side, FIG. 13 illustrates a flowchart of a wireless communication method 1300 for TDD performed by a UE according to an embodiment of the present disclosure. At step 1301, the UE detects DCI in CSS in subframe #0 of a radio frame or in a subframe in the previous radio frame. At step 1302, the UE determines shortened TTI subframe(s) in the radio frame based on the detected DCI. In an embodiment, only MBSFN (Multimedia Broadcast multicast service Single Frequency Network) subframe(s) and/or uplink subframe(s) and/or special subframe(s) can be potential subframes configured to the shortened TTI subframe.

Figure 14:
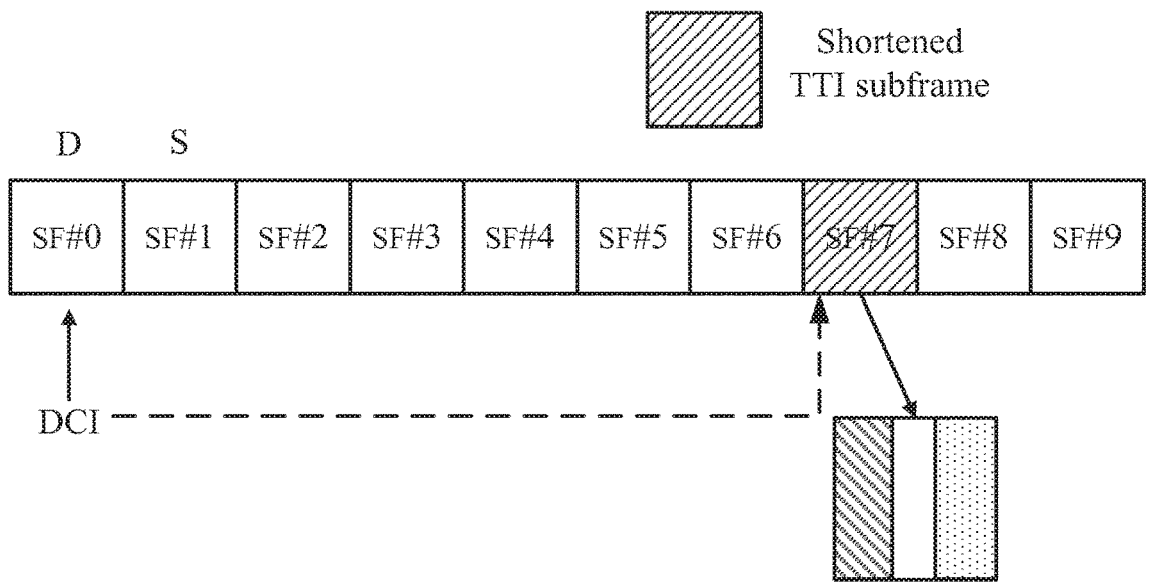
FIG. 14 schematically illustrates DCI design for indicating shortened TTI subframe(s) in TDD communication.

FIG. 14 schematically illustrates DCI design for indicating shortened TTI subframe(s) in TDD communication. As shown in FIG. 14, the DCI transmitted in CSS in subframe #0 or a subframe in the previous radio frame indicates which subframe is a new type of subframe (i.e. shortened TTI subframe). In the shown example, subframe#7 is indicated as a shortened TTI subframe.

In an embodiment, the DCI can also include eIMTA (enhanced Interference Mitigation and Traffic Adaptation) information. For example, there can be two fields in this DCI. One field is used to indicate eIMTA configuration and another field is used to indicate shortened TTI subframe configuration. In this case, for a UE supporting both eIMTA and shortened TTI subframe, only one DCI on subframe type needs to be monitored in CSS. As for a UE supporting shortened TTI subframe but not eIMTA, it can also monitor the same DCI by ignoring the eIMTA part.

Accordingly, embodiments of the present invention provide a base station and a user equipment for TDD corresponding to the above wireless communication methods. The base station can comprise: circuitry operative to form DCI for indicating shortened TTI subframe(s) in a radio frame; and a transmitter operative to transmit the DCI in CSS in subframe #0 of the radio frame or in a subframe in the previous radio frame, wherein the shortened TTI subframe is a subframe with DwPTS, guard band and UpPTS in which the ratio of DwPTS, guard band and UpPTS is arbitrarily configurable by RRC. The user equipment can comprise: a detector operative to detect DCI in CSS in subframe #0 of a radio frame or in a subframe in the previous radio frame; and circuitry operative to determining shortened TTI subframe(s) in the radio frame based the detected DCI, wherein the shortened TTI subframe is a subframe with DwPTS, guard band and UpPTS in which the ratio of DwPTS, guard band and UpPTS is arbitrarily configurable by RRC. The specific structures of the above base station and user equipment can refer to FIG. 5 and FIG. 6.

Figure 15:
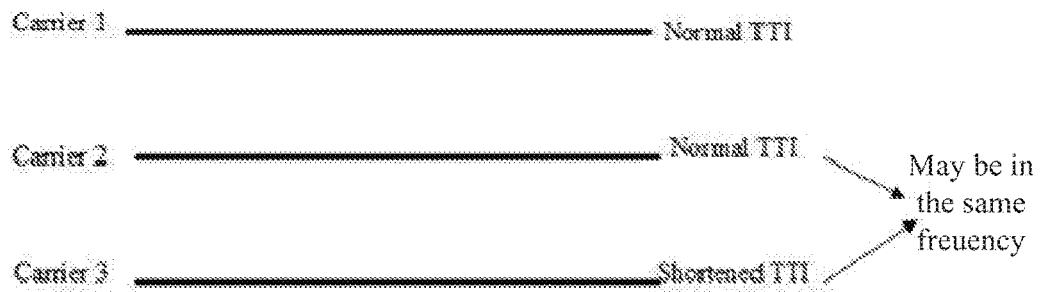
FIG. 15 schematically illustrates carrier handling for a CA/DC capable UE.

Another embodiment of the present disclosure provides a way to process shortened TTIs in CA (Carrier Aggregation) capable base stations or in CA and/or DC (Dual Connectivity) capable UEs. The base concept is to process shortened TTIs in one carrier frequency in one separate Tx/Rx chain, and the separate Tx/Rx chain regards the shortened TTIs as a virtual carrier. The physical layer processing of the shortened TTIs by the separate Tx/Rx chain can be the same as that of a real carrier. The power control mechanism for the shortened TTIs processed by the the separate Tx/Rx chain as a virtual carrier can also use the same or similar mechanism used for CA or DC. For example, the power can be scaled between normal TTIs and the shortened TTI based on UE's total power. Power headroom report (PHR) can be separately reported for the virtual carrier of the shortened TTIs or jointly reported for the virtual carrier of the shortened TTI and other carriers or virtual channels (other TTIs). Existing activation/deactivation mechanism in CA or DC can also be used for activating/deactivating shortened TTIs. The carrier frequency (i.e., the real carrier) for the shortened TTIs can be a separate carrier from normal TTIs. In this case, the processing of the virtual carrier for shortened TTIs is the same as that of its real carrier. Alternatively, the carrier frequency of the virtual carrier for the shortened TTIs can be the same as the carrier frequency for a carrier for normal TTIs, in other words, the shortened TTIs and the normal TTIs share the same real carrier. In this case, the shortened TTIs and the normal TTIs are also processed separately in separate Tx/Rx chains (i.e., as virtual carriers). For each virtual carrier, the physical layer processing is the same as a real carrier. FIG. 15 schematically illustrates carrier handling for a CA/DC capable UE. As shown in FIG. 15, the UE can handle 3 carriers. When shorten TTIs are involved, one carrier processing capability is used for processing the shortened TTIs as a virtual carrier, and the other two carrier processing capabilities can be used for processing normal TTIs. The number of BD times is independent in each carrier. In an embodiment, the shortened TTIs are allocated in Scell or Pscell. In this case, fallback is not necessary since deactivation of Scell can go back to only normal TTIs.

Figure 16:
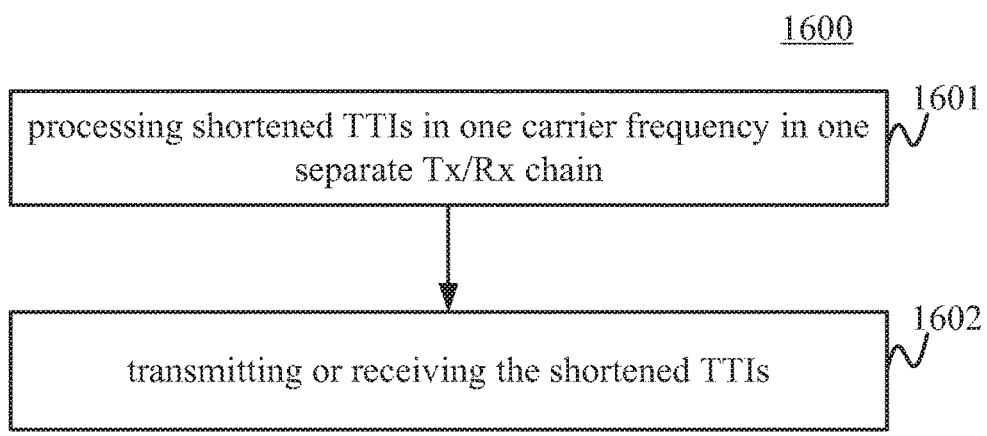
FIG. 16 illustrates a flowchart of a wireless communication method supporting carrier aggregation and/or dual connectivity according to an embodiment of the present disclosure.

FIG. 16 illustrates a flowchart of a wireless communication method 1600 supporting carrier aggregation and/or dual connectivity according to an embodiment of the present disclosure. The wireless communication method comprises: a step 1601 of processing shortened TTIs in one carrier frequency in one separate Tx/Rx chain; and a step 1602 of transmitting or receiving the shortened TTIs. The method 1600 can be performed by a base station or a user equipment.

Accordingly, embodiments of the present invention provide a base station supporting carrier aggregation and a user equipment supporting carrier aggregation and/or dual connectivity corresponding to the above wireless communication methods. The base station or the user equipment can comprise: circuitry operative to process shortened TTIs in one carrier frequency in one separate Tx/Rx chain as a virtual carrier; and a transceiver operative to transmit or receive the shortened TTIs in the virtual carrier. The specific structures of the above base station and user equipment can refer to FIG. 5 and FIG. 6 except that the transmitter or detector is replaced by the transceiver.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

Embodiments of the present disclosure can at least provide the following subject matters.

(1). A base station comprising:
circuitry operative to form either a first type of DCI or a second type of DCI depending on whether to schedule a normal TTI or a shortened TTI in a subframe; and
a transmitter operative to transmit the first type of DCI or the second type of DCI in the subframe, wherein
the normal TTI has 14 OFDM symbols, and the shortened TTI has 7 or less OFDM symbols;
the first type of DCI schedules the normal TTI and the second type of DCI schedules the shortened TTI;
the first type of DCI and the second type of DCI are differentiable from each other; and
if the second type of DCI is transmitted and another shortened TTI is to be scheduled, the circuitry is further operative to form a third type of DCI and the transmitter is further operative to transmit the third type of DCI in a shortened TTI after said shortened TTI that is scheduled by the second type of DCI in the subframe.

(2). The base state according to (1), wherein
the first type of DCI and the second type of DCI are transmitted in the PDCCH region of the subframe; and
the first type of DCI and the second type of DCI have the same size and are differentiable by a one bit field.

(3). A user equipment comprising:
a detector operative to detect a first type of DCI for scheduling a normal TTI or a second type of DCI for scheduling a shortened TTI in a subframe;
circuitry operative to determine whether the detected DCI is the first type of DCI or the second type of DCI, wherein
if the detected DCI is the second type of DCI, the detector is further operative to detect a third type of DCI in shortened TTI(s) starting from the shortened TTI right after said shortened TTI that is scheduled by the second type of DCI in the subframe; and the normal TTI has 14 OFDM symbols, and the shortened TTI has 7 or less OFDM symbols.

(4). The user equipment according to (3), wherein
the first type of DCI and the second type of DCI are transmitted in the PDCCH region of the subframe; and
the first type of DCI and the second type of DCI have the same size and are differentiable by a one bit field.

(5). A base station comprising:
circuitry operative to form a fourth type of DCI for a subframe if one type of DCI is to be used for all shortened TTIs of the subframe and form a second type of DCI and a third type of DCI for the subframe if two types of DCI are to be used for shortened TTIs of the subframe; and
a transmitter operative to transmit the fourth type of DCI in at least the PDCCH region or the start shortened TTI of the subframe if the fourth type of DCI is used and transmit the second type of DCI in the PDCCH region or the start shortened TTI of the subframe and the third type of DCI in one or more shortened TTI(s) after the second type of DCI in the subframe if the second type of DCI and the third type of DCI are used, wherein
the shortened TTI has 7 or less OFDM symbols; and
the fourth type of DCI and the second type of DCI are differentiable from each other.

(6). The base state according to (5), wherein
the circuitry is further operative to form a first type of DCI for the subframe if a normal TTI with 14 OFDM symbols is to be scheduled;
the transmitter is further operative to transmit the first type of DCI in the PDCCH region of the subframe; and
the first type of DCI, the second type of DCI and the fourth type of DCI are differentiable from one another.

(7). A user equipment comprising:
a detector operative to detect a fourth type of DCI or a second type of DCI in the PDCCH region or the start shortened TTI of a subframe; and
circuitry operative to determine whether the detected DCI is the fourth type of DCI or the second type of DCI, wherein
if the detected DCI is the fourth type of DCI, the detector is further operative to detect the fourth type of DCI in one or more shortened TTIs after where the fourth type of DCI is detected for the first time in the subframe;
if the detected DCI is the second type of DCI, the detector is further operative to detect a third type of DCI in one or more shortened TTIs after the second type of DCI in the subframe; and
the shortened TTI has 7 or less OFDM symbols.

(8). The user equipment according to (7), wherein
the detector is further operative to detect a first type of DCI for scheduling a normal TTI with 14 OFDM symbols in the PDCCH region of the subframe; and
if the first type of DCI is detected, the detector is operative to not detect DCI any more in the subframe.

(9). A base station comprising:
circuitry operative to form one type of DCI for a subframe if the length of shortened TTIs in the subframe is not smaller than a predetermined length and form two types of DCI for the subframe if the length of shortened TTIs in the subframe is smaller than the predetermined length; and
a transmitter operative to transmit the formed one type of DCI or the formed two types of DCI, wherein
the shortened TTI has 7 or less OFDM symbols; and one of the two types of DCI carries common information for one slot or one subframe, and the other of the two types of DCI carries information specific to its target shortened TTI.

(10). A user equipment comprising:
a detector operative to detect one type of DCI for a subframe if the length of shortened TTIs in the subframe is not smaller than a predetermined length and detect two types of DCI for the subframe if the length of shortened TTIs in the subframe is smaller than the predetermined length; and
circuitry operative to obtain common information for one slot or one subframe from one of the two types of DCI and obtain information specific to a target shortened TTI from the other of the two types of DCI, wherein
the shortened TTI has 7 or less OFDM symbols.

(11). A base station for TDD communication comprising:
circuitry operative to form DCI for indicating shortened TTI subframe(s) in a radio frame; and
transmitter operative to transmit the DCI in CSS in subframe #0 of the radio frame or in a subframe in the previous radio frame, wherein
the shortened TTI subframe is a subframe with DwPTS, guard band and UpPTS in which the ratio of DwPTS, guard band and UpPTS is arbitrarily configurable by RRC.

(12). The base station according to (11), wherein
the DCI also includes eIMTA information.

(13). A user equipment for TDD communication comprising:
a detector operative to detect DCI in CSS in subframe #0 of a radio frame or in a subframe in the previous radio frame; and
circuitry operative to determine shortened TTI subframe(s) in the radio frame based the detected DCI, wherein
the shortened TTI subframe is a subframe with DwPTS, guard band and UpPTS in which the ratio of DwPTS, guard band and UpPTS is arbitrarily configurable by RRC.

(14). The user equipment according to (13), wherein
the DCI also includes eIMTA information.

(15). A wireless communication method comprising:
forming either a first type of DCI or a second type of DCI depending on whether to schedule a normal TTI or a shortened TTI in a subframe; and
transmitting the first type of DCI or the second type of DCI in the subframe, wherein
the normal TTI has 14 OFDM symbols, and the shortened TTI has 7 or less OFDM symbols;
the first type of DCI schedules the normal TTI and the second type of DCI schedules the shortened TTI;
the first type of DCI and the second type of DCI are differentiable from each other; and
if the second type of DCI is transmitted and another shortened TTI is to be scheduled, the method further comprises forming and transmitting a third type of DCI in a shortened TTI after said shortened TTI that is scheduled by the second type of DCI in the subframe.

(16). A wireless communication method comprising:
detecting a first type of DCI for scheduling a normal TTI or a second type of DCI for scheduling a shortened TTI in a subframe;
if the detected DCI is the second type of DCI, further detecting a third type of DCI in shortened TTI(s) starting from the shortened TTI right after said shortened TTI that is scheduled by the second type of DCI in the subframe, wherein the normal TTI has 14 OFDM symbols, and the shortened TTI has 7 or less OFDM symbols.

(17). The wireless communication method according to (15) or (16), wherein
the first type of DCI and the second type of DCI are transmitted in the PDCCH region of the subframe; and
the first type of DCI and the second type of DCI have the same size and are differentiable by a one bit field.

(18). A wireless communication method comprising:
forming a fourth type of DCI for a subframe if one type of DCI is to be used for all shortened TTIs of the subframe and forming a second type of DCI and a third type of DCI for the subframe if two types of DCI are to be used for shortened TTIs of the subframe, and
transmitting the fourth type of DCI in at least the PDCCH region or the start shortened TTI of the subframe if the fourth type of DCI is used and transmit the second type of DCI in the PDCCH region or the start shortened TTI of the subframe and the third type of DCI in one or more shortened TTI(s) after the second type of DCI in the subframe if the second type of DCI and the third type of DCI are used, wherein
the shortened TTI has 7 or less OFDM symbols; and
the fourth type of DCI and the second type of DCI are differentiable from each other.

(19). The wireless communication method according to (18), further comprising:
forming a first type of DCI for the subframe if a normal TTI with 14 OFDM symbols is to be scheduled; and
transmitting the first type of DCI in the PDCCH region of the subframe, wherein
the first type of DCI, the second type of DCI and the fourth type of DCI are differentiable from one another.

(20). A wireless communication method comprising:
detecting a fourth type of DCI or a second type of DCI in the PDCCH region or the start shortened TTI of a subframe;
if the detected DCI is the fourth type of DCI, further detecting the fourth type of DCI in one or more shortened TTIs after where the fourth type of DCI is detected for the first time in the subframe; and
if the detected DCI is the second type of DCI, further detecting a third type of DCI in one or more shortened TTIs after the second type of DCI in the subframe, wherein
the shortened TTI has 7 or less OFDM symbols.

(21). The wireless communication method according to (20), further comprising:
detecting a first type of DCI for scheduling a normal TTI with 14 OFDM symbols in the PDCCH region of the subframe, wherein
if the first type of DCI is detected, no more DCI is to be detected in the subframe.

(22). A wireless communication method comprising:
forming one type of DCI for a subframe if the length of shortened TTIs in the subframe is not smaller than a predetermined length and forming two types of DCI for the subframe if the length of shortened TTIs in the subframe is smaller than the predetermined length; and
transmitting the formed one type of DCI or the formed two types of DCI, wherein
the shortened TTI has 7 or less OFDM symbols; and
one of the two types of DCI carries common information for one slot or one subframe, and the other of the two types of DCI carries information specific to its target shortened TTI.

(23). A wireless communication method comprising:
detecting one type of DCI for a subframe if the length of shortened TTIs in the subframe is not smaller than a predetermined length and detecting two types of DCI for the subframe if the length of shortened TTIs in the subframe is smaller than the predetermined length; and
obtaining common information for one slot or one subframe from one of the two types of DCI and obtain information specific to a target shortened TTI from the other of the two types of DCI, wherein
the shortened TTI has 7 or less OFDM symbols.

(24). A wireless communication method for TDD comprising:
forming DCI for indicating shortened TTI subframe(s) in a radio frame; and
transmitting the DCI in CSS in subframe #0 of the radio frame or in a subframe in the previous radio frame, wherein
the shortened TTI subframe is a subframe with DwPTS, guard band and UpPTS in which the ratio of DwPTS, guard band and UpPTS is arbitrarily configurable by RRC.

(25). A wireless communication method for TDD comprising:
detecting DCI in CSS in subframe #0 of a radio frame or in a subframe in the previous radio frame; and
determining shortened TTI subframe(s) in the radio frame based on the detected DCI, wherein
the shortened TTI subframe is a subframe with DwPTS, guard band and UpPTS in which the ratio of DwPTS, guard band and UpPTS is arbitrarily configurable by RRC.
the DCI also includes eIMTA information.

(26). The wireless communication method according to (24) or (25), wherein
the DCI also includes eIMTA information.

(27). A base station supporting carrier aggregation comprising:
circuitry operative to process shortened TTIs in one carrier frequency in one separate Tx/Rx chain; and
a transceiver operative to transmit or receive the shortened TTIs, wherein
the shortened TTI has 7 or less OFDM symbols.

(28) The base station according to (27), wherein
The carrier frequency for the shortened TTIs is separate from normal TTIs, or the carrier frequency for the shortened TTIs is the same as the carrier frequency for a carrier of normal TTIs.

(29) The base station according to (27), wherein
the power control mechanism for the shortened TTIs processed by the the separate Tx/Rx chain uses the same mechanism for carrier aggregation or dual connectivity.

(30) A user equipment supporting carrier aggregation and/or dual connectivity comprising:
circuitry operative to process shortened TTIs in one carrier frequency in one separate Tx/Rx chain; and
a transceiver operative to transmit or receive the shortened TTIs, wherein
the shortened TTI has 7 or less OFDM symbols.

(31) The user equipment according to (30), wherein
the carrier frequency for the shortened TTIs is separate from normal TTIs, or the carrier frequency for the shortened TTIs is the same as the carrier frequency for a carrier of normal TTIs.

(32) The user equipment according to (30), wherein
the power control mechanism for the shortened TTIs
processed by the the separate Tx/Rx chain uses the
same mechanism for carrier aggregation or dual connectivity.
(33) The user equipment according to (30), wherein
power is scaled between normal TTIs and the shortened
TTI based on the user equipment's total power.
(34) A wireless communication method supporting carrier
aggregation and/or dual connectivity comprising:
processing shortened TTIs in one carrier frequency in one
separate Tx/Rx chain; and
transmitting or receiving the shortened TTIs, wherein
the shortened TTI has 7 or less OFDM symbols.
(35) The wireless communication method according to
(34), wherein
the carrier frequency for the shortened TTIs is separate
from normal TTIs, or the carrier frequency for the
shortened TTIs is the same as the carrier frequency for
a carrier of normal TTIs.
(36) The wireless communication method according to
(34), wherein
the power control mechanism for the shortened TTIs
processed by the separate Tx/Rx chain uses the same
mechanism for carrier aggregation or dual connectivity.
(37) The wireless communication method according to
(34), wherein
Power headroom report (PHR) is separately reported for
the shortened TTIs or jointly reported for the shortened
TTIs and other TTIs.
(38) The wireless communication method according to
(34), wherein
the activation/deactivation mechanism in CA or DC is
used for activating/deactivating the shortened TTIs.

In addition, embodiments of the present disclosure can also provide an integrated circuit which comprises module(s) for performing the step(s) in the above respective communication methods. Further, embodiments of the present can also provide a computer readable storage medium having stored thereon a computer program containing a program code which, when executed on a computing device, performs the step(s) of the above respective communication methods.

The invention claimed is:

1. A user equipment comprising:

a detector operative to detect a fourth type of downlink control information (DCI) or a second type of DCI in a Physical Downlink Control Channel (PDCCH) region or a starting shortened transmission time interval (TTI) of a subframe; and circuitry operative to determine whether DCI detected by the detector is the fourth type of DCI or the second type of DCI, wherein:

if the DCI detected by the detector is the fourth type of DCI, the detector is further operative to detect the fourth type of DCI in one or more shortened TTIs after where the fourth type of DCI is detected for a first time in the subframe;

if the DCI detected by the detector is the second type of DCI, the detector is further operative to detect a third type of DCI in one or more shortened TTIs after the second type of DCI in the subframe;

each shortened TTI has 7 or less orthogonal frequency division multiplexing (OFDM) symbols, the second type of DCI carries common information for one slot or one subframe, and the third type of DCI carries information specific to a target shortened TTI, the circuitry is further operative to form a first type of DCI for the subframe if a normal TTI with 14 OFDM symbols is to be scheduled, and the first type of DCI, the second type of DCI and the fourth type of DCI having the same size are differentiable from one another by a two-bit field.

2. The user equipment according to claim 1, wherein
the detector is further operative to detect the first type of DCI in the PDCCH region of the subframe.

3. The user equipment according to claim 1, wherein
the detector is further operative to detect the first type of DCI for scheduling a normal TTI with 14 OFDM symbols in the PDCCH region of the subframe; and
if the first type of DCI is detected, the detector is operative to not detect DCI any more in the subframe.

* * * * *